Dec. 6, 1955 R. B. ROBINSON 2,726,331

TRIANGULAR-WAVE GENERATORS

Filed Aug. 14, 1950

INVENTOR.
ROBERT B. ROBINSON

BY
Reynolds, Beach & Christensen

ATTORNEYS

United States Patent Office 2,726,331

Patented Dec. 6, 1955

2,726,331

TRIANGULAR-WAVE GENERATORS

Robert B. Robinson, Seattle, Wash., assignor to Boeing Airplane Company, Seattle, Wash., a corporation of Delaware Application August 14, 1950, Serial No. 179,357

5 Claims. (Cl. 250—36)

This invention relates to an oscillator circuit for generating triangular waves of voltage, and more particularly to one capable of wide-range adjustment in wave frequency without variation in amplitude of the output wave. The term "triangular wave" as used herein denotes a recurring wave form having substantially constant rate of rise and rate of fall or decay between successive reversing points.

A more specific object of the invention is an electronic circuit of the described type, in which the triangular-wave frequency may be adjusted by a single control from a very low value to a relatively high value without necessity for any compensating adjustment for maintaining constant wave amplitude.

Still another object is a triangular-wave generating circuit capable of producing a symmetrical output wave having a substantially linear rise and equally linear fall.

Another object is a circuit of this type in which the wave form may be changed from its normal symmetrical form to different triangular-wave asymmetrical forms without altering wave amplitude.

In previous types of triangular-wave generating circuits of which I am aware wave form, amplitude and frequency depended mutually upon a given relationship of circuit components, so that if such relationship were varied for changing one or another of these wave characteristics one or more of the remaining wave characteristics would also be disturbed, and could be restored or maintained constant only by separate compensating adjustments. Moreover, the same degree of linearity in the rise and fall characteristics of their wave forms was not usually obtainable. The present invention provides a relatively simple and easily adjusted circuit overcoming these and other difficulties of prior devices.

With the foregoing objects in view the present invention briefly comprises a trigger or switching circuit including an amplifier connected to a cathode-follower regenerative feed-back stage, such circuit having two steady-state or equilibrium operating conditions, attended respectively by cut-off and maximum current flow in such amplifier. Switching of such circuit between its opposite equilibrium conditions produces a relatively high-amplitude rectangular wave at the cathode follower. Such wave is applied to an integrating network. The resulting voltage variation attending charge and discharge of the storage element in such integrating network provides the desired triangular wave form and, in accordance with an important feature, such wave is utilized directly to control or initiate switching of the regenerative feed-back circuit alternately between equilibrium conditions. Such integrating network thereby controls the frequency of the over-all circuit, and by adjustment of the time-constant of the integrating network to different values corresponding changes in the operating frequency of the circuit are effected. However, such changes in frequency do not affect the amplitude or degree of linearity of the triangular wave, because the critical control or alternate reversal-initiating voltages of the trigger circuit between which, as limits, the integrating network storage element voltage effectively varies, remain constant.

As a further important feature, bias means interposed in the circuit at a suitable location, the preferred location being between the integrating network and the regenerative feed-back cathode-follower, establishes the wave form, with reference to the relative lengths of the rise and fall periods of the triangular wave. Normally such bias is adjusted to produce a symmetrical triangular wave, but may be changed to produce different asymmetrical forms.

These and other features, objects and advantages of the improved circuit will become more fully evident from the following detailed description thereof by reference to the accompanying drawings.

Figure 1:
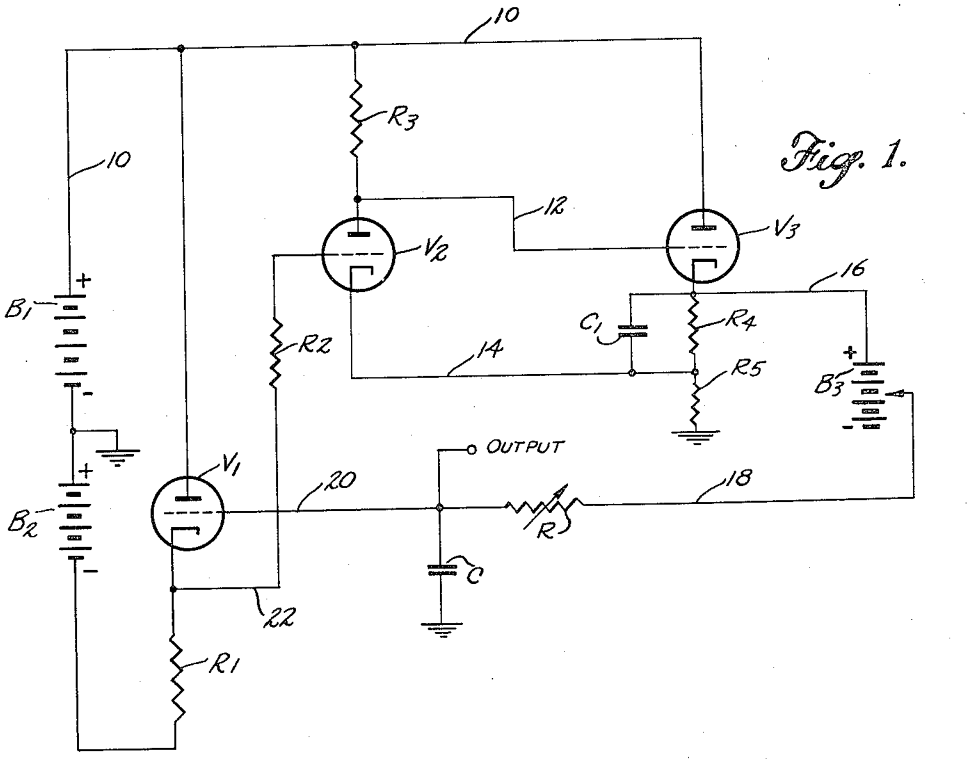
Figure 1 is a schematic diagram of the presently preferred form of the triangular-wave generating circuit.

In Figure 1 the amplifier tube V2, preferably of a high-mu (amplification) type, cooperates with the regenerative feed-back cathode-follower amplifier tube V3 in a switching or trigger circuit, in which the amplifier tube V2 has two steady-state or stable conditions of equilibrium, namely cut-off and current flow at a predetermined maximum value. Anode voltage is applied to the tube V2 through the plate load resistor R3 and supply conductor 10 from the anode voltage source B1, and directly to the anode of tube V3 from conductor 10, as shown. The cathode of amplifier tube V2 is connected by conductor 14 directly to the junction between resistors R4 and R5 which extend connected in series between the cathode of tube V3 and ground. A transient coupling condenser C1 interconnects the cathode of tube V3 and conductor 14, by-passing resistor R4, and accelerates switching of the trigger circuit between equilibrium conditions. The anode of tube V2 is connected directly by conductor 12 to the control grid of tube V3.

Conduction in amplifier tube V2, being controlled by the difference in potential between cathode conductor 14 and the control grid of such tube, depends upon voltage drop in resistance R5 resulting from load current in cathode-follower amplifier tube V3. On the other hand, the potential with reference to ground of the grid of tube V2 is equal to the voltage drop in resistor R1 resulting from current flow in cathode-follower amplifier tube V1, less the voltage of bias source B2. Tube V1, resistor R1 and source B2 are connected in series between supply conductor 10 and ground, and the cathode of such tube is connected by conductor 22 to the grid of amplifier tube V2 through grid-leak resistor R2.

The potential at the cathode of cathode-follower amplifier tube V3 is applied by conductors 16 and 18 to an integrating network comprising the variable resistor R and the storage condenser C. A subtractive bias source B3 is interposed in series with conductors 16 and 18 for establishing the direct voltage level or reference value of the alternating potential actually applied to the integrating network from the cathode of the tube V3. Preferably the bias source B3 is of an adjustable type, and the variable tap battery is intended only as a general representation of any suitable means for changing the direct-voltage level of a rectangular wave with reference to ground, a cathode-follower with output voltage divider comprising an example of one such means. The control grid of cathode-follower amplifier tube V1 assumes the potential of instantaneous charge on condenser C with reference to ground, the junction between resistor R and condenser C being connected by conductor 20 to such control grid.

The supply and bias voltages, and the circuit values and relationships are such that switching of amplifier tube V2 between cut-off and current-flow equilibrium conditions is initiated by decrease of potential on condenser C below a critical control value, and increase of such potential above a critical higher control value, respectively. Such critical values are determined primarily by the switching circuit constants and the characteristics of amplifier tube V2. Alternate increase and decrease of condenser voltage is effected in turn by the rectangular voltage wave produced at the cathode of amplifier tube V3 and applied to the integrating network. The rate of charge and discharge of condenser C, hence the frequency of oscillation of the switching circuit is established by the constants of the integrating network R and C and may be varied by adjustment of the value of either of these components, such as resistor R.

The operation of the circuit may be explained as follows: Let it be assumed initially that the potential of the grid of amplifier tube V2 drops far enough relative to its cathode potential to decrease current flow through such tube even slightly. The resulting reduction in voltage drop in the plate load resistor R3 causes a proportional rise in potential of conductor 12 and a corresponding rise in potential relative to ground of conductor 14 because of the accompanying increase of current in the cathode follower V3. As the potential of conductor 14 rises the flow of anode current in amplifier tube V2 is further decreased and its anode potential and current flow in tube V3 correspondingly increased. Such regenerative action effected by cathode follower amplifier V3 quickly drives the amplifier V2 to cut-off, therefore, upon an initial reduction in current flow through such latter amplifier tube. When such cut-off point is reached, the potential of conductor 16 relative to ground will be maximum, representing the crest of the rectangular voltage wave produced by the trigger circuit. Such maximum potential, reduced by the bias voltage of source B3, is applied to the R–C integrating network and causes charging current to flow through resistor R into storage condenser C. Thereupon the potential of conductor 20 rises exponentially as a function of time following initiation of the maximum voltage level at the cathode of tube V3. At the same time the flow of current through cathode-follower tube V1 increases in proportion to the progressively rising potential at the grid of such amplifier, as does the resulting potential applied to the control grid of amplifier tube V2 through the conductor 22.

When the storage condenser voltage has risen to the point at which the grid potential of amplifier tube V2 relative to its cathode exceeds the critical value of the tube under prevailing circuit conditions, current flow in such amplifier tube is suddenly initiated. The resulting decrease in potential of conductor 12 causes a corresponding decrease in current flow through the cathode-follower amplifier V3 and correspondingly in the potential at the cathode of amplifier tube V2 and results in a further increase in current through such latter amplifier. The regenerative switching action now continues in reverse until amplifier V2 is driven to the maximum current flow condition, representing the alternate equilibrium condition of the trigger circuit. The potential at the cathode of cathode-follower V3 is then established at its minimum value, representing the base of the rectangular wave, and condenser C now commences to discharge progressively through the resistor R and the load circuit of cathode follower V3.

When the potential of conductor 20 with reference to ground has again decreased to the point at which the grid potential of amplifier tube V2 is less than the critical cut-off value, the switching action again reverses, and a new cycle of operation is commenced.

Figure 2:
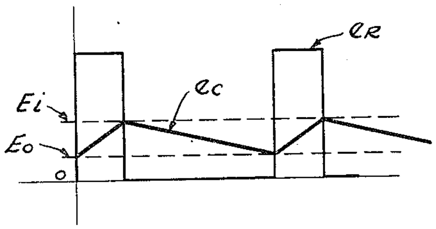
Figures 2 and 3 are voltage-time graphs showing wave forms under different operating conditions in the circuit.
Figure 3:
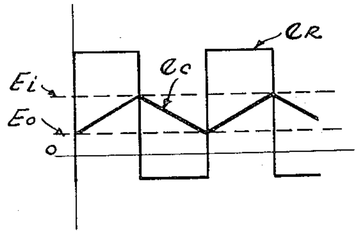

Figures 2 and 3 graphically illustrate the rectangular wave *e*R applied to the integrating network R–C. The base or reference potential of this wave in Figure 2 is shown equal to zero, a condition which is obtained if the effective bias voltage of source B3 exactly neutralizes the rectangular wave base potential at the cathode of V3. The spaced dotted lines E*i* and E*o*, parallel to the ground or zero potential base line, represent the potentials of conductor 20 at which the initial conduction flow and cut-off conditions of amplifier V2 are obtained during increase or decrease in such conductor potential, respectively. The potential difference between these two control values depends upon the amplification factor of tube V2 and the circuit constants of the trigger circuit, as mentioned.

In actual practice the amplitude of the rectangular wave *e*R applied to the integrating network will be much larger relative to the potential difference between the critical values E*i* and E*o* than shown in the graph, so that only the substantially linear early portions of the condenser charge and discharge exponential voltage variations are utilized in effecting reversals of the switching circuit. Such alternate linear variations in condenser voltage, represented by the graph line *e*C, extend between the limits E*i* and E*o*, as limits, and become the output triangular wave of the circuit.

In Figure 2 the reference or base value of the rectangular wave applied to the integrating network is such with relation to the critical cut-off and conduction initiating voltages of the amplifier V2 that the triangular wave *e*C is asymmetrical, the decay period being substantially longer than the rise period of such wave.

In Figure 3 the voltage of bias source B3 has been increased relative to that in the case of Figure 2, so that now the base or reference value of the rectangular wave is established as far below the critical cut-off voltage E*o* as the crest or maximum value of such rectangular wave is above the critical conduction flow voltage E*i*, with the result that the rectangular wave *e*R and the triangular wave *e*C are symmetrical. In this case an equal degree of linearity in the rise and fall portions of the triangular wave is obtained, as the effective charging and discharging voltages applied to the integrating network are equal, assuming the combined resistance of R4 and R5 is negligible relative to that of R. If it is not negligible, substantially perfect wave symmetry may be obtained nevertheless by slight adjustment of bias source B3 to compensate.

It will be noted from a comparison of Figures 2 and 3 that the change in wave pattern effected by varying the bias voltage of V3 does not alter the amplitude of the triangular wave. This is true because of the fact that the critical control voltages E*i* and E*o*, between which the triangular wave varies as upper and lower limits remain constant. Moreover, a change in the time-constant of the R–C integrating network, as by change in resistance value of resistor R, or in capacitance value of condenser C, causing a change in the charge and discharge rates of the condenser C, hence a change in the frequency of operation of the circuit, likewise has no effect upon the amplitude of the triangular wave at the output terminal for the same reason.

The effect of cathode follower V1, constituting an impedance transformer, is to isolate the grid circuit of amplifier V2 from the integrating network so that grid current flow in such latter amplifier will not affect the rate of discharge of condenser C, which must discharge through resistor R. Resistor R2 limits grid current flow in amplifier V2. As mentioned, condenser C1, by-passing resistor R4, accelerates the switching action or reversals between equilibrium conditions in the trigger circuit comprising tubes V2 and V3, so that triangular wave reversals are abrupt.

It will be noted that the effect of varying the voltage of bias source B3 is to displace, in terms of potential difference, the base or reference potential of the rectangular wave and the critical control potentials E*i* and E*o*. This result may be accomplished by varying the bias of amplifier V2 in other ways also, as by applying a bias voltage between the condenser C and the control grid of amplifier tube V1.

I claim as my invention:

1. The triangular-wave generating circuit comprising a rectangular-wave-producing trigger circuit including an output and a control input and having two equilibrium conditions, switching of such trigger circuit from one such condition to the other being initiated by increase of the control input potential above a predetermined value, and reverse switching by decrease of such potential below a predetermined lower value, a resistance-capacitance integrating network, means operatively connecting said trigger circuit output to said network for application of the rectangular wave from said trigger circuit to said network, cathode-follower amplifier means having its control input connected to the integrating network capacitor and its cathode output connected to the trigger circuit input for initiating switching of said switching circuit back and forth between said equilibrium conditions by rise and fall of capacitor voltage, respectively, the time constant of said network being long in relation to the periods between such switching, and variable bias means in the circuit for varying the direct-voltage level of the rectangular wave with reference to said predetermined values.

2. The triangular-wave generating circuit comprising a rectangular-wave-producing trigger circuit including an output and a control input and having two equilibrium conditions, switching of such trigger circuit from one such condition to the other being initiated by increase of the control input potential above a predetermined value, and reverse switching by decrease of such potential below a predetermined lower value, a resistance-capacitance integrating network, means operatively connecting said trigger circuit output to said network for application of the rectangular wave from said trigger circuit to said network, and cathode-follower means connecting the integrating network capacitor to the trigger circuit input for initiating switching of said trigger circuit back and forth between said equilibrium conditions by rise and fall of capacitor voltage, respectively, the time constant of said network being long in relation to the periods between such switching.

3. The triangular-wave generating circuit comprising a rectangular-wave-producing trigger circuit including an output and a control input and having two equilibrium conditions, switching of such trigger circuit from one such condition to the other being initiated by increase of the control input potential above a predetermined value, and reverse switching by decrease of such potential below a predetermined lower value, a resistance-capacitance integrating network, means operatively connecting said trigger circuit output to said network for application of the rectangular wave from said trigger circuit to said network, impedance transforming means connecting the integrating network capacitor to the trigger circuit input for initiating switching of said trigger circuit back and forth between said equilibrium conditions by rise and fall of capacitor voltage, respectively, while isolating such capacitor from current drainage thereof to said trigger circuit, the time constant of said network being long in relation to the periods between such switching and variable-bias means in the circuit for varying the direct-voltage level of the rectangular wave with reference to said predetermined values.

4. The triangular-wave generating circuit comprising a rectangular-wave-producing trigger circuit including a control input and having two equilibrium conditions, switching of such trigger circuit from one such condition to the other being initiated by increase of the control input potential above a predetermined value, and reverse switching by decrease of such potential below a predetermined lower value, said trigger circuit comprising cathode follower amplifier means having a control element and having a cathode load impedance, a separate amplifier means having an anode load impedance coupled to said cathode follower control element and having a cathode connected to said cathode follower load impedance, whereby at least a portion of said load impedance is common to the anode-cathode circuit of said cathode follower amplifier and said separate amplifier means, said separate amplifier means having a control element comprising the trigger circuit control input, whereby rectangular wave voltage is developed across said cathode follower impedance by repeated switching of said trigger circuit between said equilibrium conditions; a resistance-capacitance integrating network; means applying rectangular wave voltage developed in said cathode follower load impedance to said network for charging and discharging of said network capacitance; and cathode follower means connecting the integrating network capacitor to the trigger circuit input for initiating switching of said trigger circuit back and forth between said equilibrium conditions by rise and fall of capacitor voltage, respectively, the time constant of said network being long in relation to the periods between such switching.

5. The triangular-wave generating circuit defined in claim 4, and adjustable-bias means in said circuit for varying the direct-voltage level of the rectangular wave applied to the integrating network with reference to the said predetermined values of potential effecting switching of the trigger circuit.

References Cited in the file of this patent

UNITED STATES PATENTS

| | | |
|---|---|---|
| 2,492,736 | Custin | Dec. 27, 1949 |
| 2,550,878 | Staub | May 1, 1951 |
| 2,562,188 | Hance | July 31, 1951 |

FOREIGN PATENTS

| | | |
|---|---|---|
| 587,940 | Great Britain | May 9, 1947 |

OTHER REFERENCES

"A Wide-Range Saw-Tooth Generator" by Peter G. Sulzer, pages 78–80, Review of Scientific Instruments, vol. 20, No. 1, January 1949.

"Radar Electronic Fundamentals," Navships 900,016, Bureau of Ships, Published June 1944.